US00RE48689E

(19) United States
(12) Reissued Patent
Cho et al.

(10) Patent Number: US RE48,689 E
(45) Date of Reissued Patent: *Aug. 17, 2021

(54) DISPLAY DEVICE AND BACKLIGHT UNIT INCLUDED THEREIN

(71) Applicant: SAMSUNG ELECTRONICS CO., LTD., Suwon-si (KR)

(72) Inventors: Byoung-Jin Cho, Anyang-si (KR); Dae-hee Lee, Hwaseong-si (KR); Kye Hoon Lee, Yongin-si (KR); Nae-Won Jang, Seongnam-si (KR)

(73) Assignee: SAMSUNG ELECTRONICS CO., LTD., Suwon-si (KR)

( * ) Notice: This patent is subject to a terminal disclaimer.

(21) Appl. No.: 16/901,618

(22) Filed: Jun. 15, 2020

Related U.S. Patent Documents

Reissue of:
(64) Patent No.: 10,444,424
Issued: Oct. 15, 2019
Appl. No.: 15/875,691
Filed: Jan. 19, 2018

U.S. Applications:
(63) Continuation of application No. 15/083,876, filed on Mar. 29, 2016, now Pat. No. 9,904,000, which is a
(Continued)

(30) Foreign Application Priority Data

Jan. 15, 2015 (KR) ..... 10-2015-0007377

(51) Int. Cl.
*F21V 8/00* (2006.01)
*G02F 1/1335* (2006.01)
(Continued)

(52) U.S. Cl.
CPC ..... *G02B 6/0061* (2013.01); *G02B 6/005* (2013.01); *G02B 6/0011* (2013.01);
(Continued)

(58) Field of Classification Search
CPC .. G02B 6/0088; G02B 6/0026; G02B 6/0011; G02B 6/0061; G02B 6/0055;
(Continued)

(56) References Cited

U.S. PATENT DOCUMENTS 9,513,427 B2 * 12/2016 Cho ..... G02B 6/0055
9,535,206 B2 1/2017 You et al.
(Continued)

FOREIGN PATENT DOCUMENTS

CN 103727458 A 4/2014
CN 103901661 A 7/2014
(Continued)

OTHER PUBLICATIONS

Communication dated May 4, 2018 issued by the State Intellectual Property Office of P.R. China in counterpart Chinese Application No. 201510573784.1 (Year: 2018).*
(Continued)

*Primary Examiner* — Deandra M Hughes
(74) *Attorney, Agent, or Firm* — Sughrue Mion, PLLC

(57) ABSTRACT

A display device includes a light source to emit light, a light guide plate on which the light emitted from the light source is incident and which irradiates light through a first and a second surface of the light guide plate, a quantum dot sheet on which the light irradiated through the first surface of the light guide plate is incident and which irradiates blue light, green light and red light, a reflective sheet for reflecting the irradiated light to the light guide plate, and a light-converting material at an edge portion of the light guide plate, the quantum dot sheet and the reflective sheet, for converting the light into a yellow light, green light or red light. The light incident on the quantum dot sheet includes the light emitted from the light source and the yellow light, the green light or the red light.

22 Claims, 15 Drawing Sheets

Related U.S. Application Data continuation of application No. 14/736,686, filed on Jun. 11, 2015, now Pat. No. 9,513,427.

(60) Provisional application No. 62/089,469, filed on Dec. 9, 2014.

(51) Int. Cl.
*G02F 1/13357* (2006.01)
*G02F 1/1333* (2006.01)
*B82Y 20/00* (2011.01)

(52) U.S. Cl.
CPC ..... *G02B 6/0023* (2013.01); *G02B 6/0026* (2013.01); *G02B 6/0031* (2013.01); *G02B 6/0043* (2013.01); *G02B 6/0053* (2013.01); *G02B 6/0055* (2013.01); *G02B 6/0088* (2013.01); *G02F 1/133615* (2013.01); *B82Y 20/00* (2013.01); *G02F 1/133388* (2021.01); *G02F 1/133614* (2021.01); *Y10S 977/774* (2013.01)

(58) Field of Classification Search
CPC .... G02B 6/005; G02B 6/0023; G02B 6/0043; G02B 6/0031; G02B 6/0053; G02F 1/133615; G02F 2001/133614; G02F 2001/133388; B82Y 20/00
See application file for complete search history.

(56) References Cited

U.S. PATENT DOCUMENTS

| | | | | |
|---|---|---|---|---|
| 9,726,928 | B2 * | 8/2017 | Kang | C09K 11/565 |
| 9,904,000 | B2 * | 2/2018 | Cho | G02B 6/0043 |
| 10,444,424 | B2 * | 10/2019 | Cho | G02B 6/0026 |
| 10,488,709 | B2 * | 11/2019 | Kim | G02F 1/133603 |
| 10,649,114 | B2 * | 5/2020 | Lee | G02B 1/14 |
| 10,663,648 | B2 * | 5/2020 | Yoo | G02B 6/0088 |
| 10,732,338 | B2 * | 8/2020 | Lee | G02B 6/0088 |
| 2012/0256163 | A1 * | 10/2012 | Yoon | G02F 1/133603 257/13 |
| 2014/0319995 | A1 | 10/2014 | Kim et al. | |
| 2015/0117052 | A1 | 4/2015 | Hsu | G02B 6/0043 362/606 |
| 2015/0160401 | A1 * | 6/2015 | Namekata | G02B 6/005 349/65 |
| 2015/0185410 | A1 * | 7/2015 | Song | G02B 6/0018 349/65 |
| 2015/0266509 | A1 | 9/2015 | Ignaczak et al. | |
| 2015/0285969 | A1 * | 10/2015 | Kim | G02B 5/201 359/891 |
| 2015/0286097 | A1 * | 10/2015 | Lee | G02F 1/133617 349/61 |
| 2016/0003450 | A1 * | 1/2016 | Lee | H01L 33/505 362/84 |
| 2016/0003998 | A1 * | 1/2016 | Benoit | G02B 6/0025 349/71 |
| 2016/0054503 | A1 * | 2/2016 | Fan | G02B 6/0023 349/65 |
| 2016/0154162 | A1 * | 6/2016 | Cheng | G02B 6/005 362/607 |
| 2016/0161661 | A1 * | 6/2016 | Cho | G02B 6/0043 362/606 |
| 2016/0209578 | A1 * | 7/2016 | Cho | G02B 6/0026 |
| 2016/0223739 | A1 * | 8/2016 | Yoon | G02B 6/0085 |
| 2016/0266299 | A1 * | 9/2016 | Yoon | G02B 6/0026 |
| 2016/0307519 | A1 * | 10/2016 | Chen | G02B 6/005 |
| 2017/0017123 | A1 * | 1/2017 | Lee | G02F 1/133514 |
| 2017/0219759 | A1 * | 8/2017 | Oh | G02B 6/005 |
| 2017/0277002 | A1 * | 9/2017 | Yamada | C08K 9/10 |
| 2018/0156966 | A1 * | 6/2018 | Cho | G02B 6/0055 |
| 2019/0086608 | A1 * | 3/2019 | Yoo | G02B 6/005 |
| 2019/0293839 | A1 * | 9/2019 | Lee | G02B 1/14 |
| 2020/0150491 | A1 * | 5/2020 | Jang | H05B 47/165 |
| 2020/0174308 | A1 * | 6/2020 | Lee | G02B 6/0088 |
| 2020/0251529 | A1 * | 8/2020 | Chu | G02B 6/005 |

FOREIGN PATENT DOCUMENTS

| | | | |
|---|---|---|---|
| CN | 104067164 | A | 9/2014 |
| CN | 205067915 | U | 3/2016 |
| JP | 2001-084822 | A | 3/2001 |
| JP | 2010-062135 | A | 3/2010 |
| JP | 2012-146680 | A | 8/2012 |
| KR | 10-1999-0050940 | A | 7/1999 |
| KR | 10-2007-0002756 | A | 1/2007 |
| KR | 10-2009-0045977 | A | 5/2009 |
| KR | 10-1156096 | B1 | 6/2012 |
| KR | 10-2012-0075093 | A | 7/2012 |
| KR | 10-2012-0080065 | A | 7/2012 |
| KR | 10-2013-0057092 | A | 5/2013 |
| KR | 10-2014-0115924 | A | 10/2014 |
| WO | 2012/017613 | A1 | 2/2012 |
| WO | 2016/018016 | A1 | 2/2016 |

OTHER PUBLICATIONS

Communication dated Oct. 17, 2018 issued by the Indian Patent Office in counterpart Indian Application No. 3001/DEL/2015. (Year: 2018).*

Communication dated Jun. 26, 2015 issued by Korean Intellectual Property Office in counterpart Korean Application No. 10-2015-0007377. (Year: 2015).*

Communication dated Mar. 12, 2015, issued by the Korean Intellectual Proeprty Office in counter part Korean Application No. 10-2015-0007377. (Year: 2015).*

International Search Report (PCT/ISA/210) dated Sep. 18, 2015, issued in International Application No. PCT/KR2012/005848. (Year: 2015).*

Communication dated Jan. 29, 2019 from the State Intellectual Property Office of People's Republic of China in counterpart Application No. 201510573784.1. (Year: 2019).*

Communication dated Oct. 22, 2015, issued by the European Patent Office in European Application No. 15179296.7.

Communication dated Feb. 3, 2017, from the European Patent Office in counterpart European Application No. 15179296.7.

Communication dated Sep. 26, 2017, issued by the European Patent Office in counterpart European Application No. 15179296.7.

Communication dated Jan. 29, 2019, from the State Intellectual Property Office of People's Republic of China in counterpart Application No. 201710243527.0.

* cited by examiner (a)

(b)

DISPLAY DEVICE AND BACKLIGHT UNIT INCLUDED THEREIN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 10,444,424, which was filed as U.S. patent application Ser. No. 15/875,691 on Jan. 19, 2018 and issued on Oct. 15, 2019, the disclosure of which is hereby incorporated by reference in its entirety.*

CROSS-REFERENCE TO RELATED APPLICATION

The present application is a continuation of U.S. patent application Ser. No. 15/083,876 filed Mar. 29, 2016, which is a continuation of U.S. patent application Ser. No. 14/736,686 filed Jun. 11, 2015 and issued as U.S. Pat. No. 9,513,427, which claims the benefit of priority under 35 U.S.C. § 119(b) of Korean Patent Application No. 10-2015-0007377, filed on Jan. 15, 2015 in the Korean Intellectual Property Office, and which claims the benefit of priority under 35 U.S.C. § 119(e) of U.S. Provisional Application No. 62/089,469, filed in the U.S. Patent and Trademark Office on Jan. 15, 2015, the disclosures of all these applications are incorporated herein by reference in their entireties.

BACKGROUND

1. Field

Exemplary embodiments relate to a display device, and more particularly, to a display device including an edge type backlight unit.

2. Description of the Related Art

A display device is a device which includes a display panel to display an image of a broadcast signal or various formats of image data.

The display panel may be an emissive display panel which emits light by itself and a non-emissive display panel which does not emit the light by itself. The emissive display panel includes a cathode ray tube (CRT) panel, an electroluminescence (EL) panel, an organic light emitting diode (OLED) panel, a vacuum fluorescence display (VFD) panel, a field emission display (FED) panel, a plasma display panel (PDP), etc., and the non-emissive display panel includes a liquid crystal display (LCD) panel, etc.

The liquid crystal display panel includes a backlight unit emitting a white light and a display panel transmitting or blocking the light emitted from the backlight unit.

In particular, it is important for the liquid crystal display panel to have uniform brightness and uniform color tone on an entire surface. In order to achieve the above, the backlight unit should irradiate light having a uniform brightness and a uniform color tone on an entire surface.

Due to a structural difference between an edge portion and a central portion of the backlight unit, however, the brightness and color tone of the light irradiated from the edge portion differ from the brightness and color tone of the light irradiated from the central portion.

SUMMARY

It is an aspect of the exemplary embodiments to provide a display device and a backlight unit which minimize a difference between brightness of light irradiated from an edge portion and brightness of light irradiated from a central portion and a difference between a color tone of the light irradiated from the edge portion and a color tone of the light irradiated from the central portion.

A display device according to an exemplary embodiment includes a display panel, a backlight unit outputting light to the display panel, and an optical member configured to refract or reflect the light output from the backlight unit and provide the display panel with the refracted or reflected light, and the backlight unit includes a light source emitting the light, a light guide plate configured to scatter the light emitted from the light source and irradiate the scattered light to a front surface of the backlight unit, a reflective sheet configured to reflect the light, which is irradiated to a rear surface of the light guide plate, to the light guide plate, a quantum dot sheet configured to convert the light, which is irradiated to the front surface of the light guide plate, into a white light, and a light-converting material provided on an edge portion of the reflective sheet for converting the light at the edge portion of the reflective sheet into the white light.

According to an exemplary embodiment, the light-converting material may include a fluorescent material.

According to an exemplary embodiment, the light-converting material may be applied to the reflective sheet.

According to an exemplary embodiment, the light-converting material may be applied to the reflective sheet in an area defined by a width extending from a first end of the reflective sheet to a central portion of the reflective sheet.

According to an exemplary embodiment, an area of the applied light-converting material may be decreased as a distance from the first end of the reflective sheet to the central portion of the reflective sheet is increased According to an exemplary embodiment, a concentration of the light-converting material may be decreased as a distance from the first end of the reflective sheet to the central portion of the reflective sheet is increased.

According to an exemplary embodiment, the light-converting material may be applied in a circular pattern to the reflective sheet.

According to an exemplary embodiment, the light-converting material may be applied in a polygonal pattern to the reflective sheet.

According to an exemplary embodiment, the light-converting material may be applied in a stripe pattern to the reflective sheet.

According to an exemplary embodiment, the light-converting material may be applied to the light guide plate.

According to an exemplary embodiment, the light-converting material may be applied to the quantum dot sheet.

According to an exemplary embodiment, the backlight unit may further include an optical sheet including the light-converting material on an edge portion thereof.

According to an exemplary embodiment, the optical sheet may be provided between the reflective sheet and the light guide plate.

According to an exemplary embodiment, the optical sheet may be provided between the light guide plate and the quantum dot sheet.

According to an exemplary embodiment, the optical sheet may be provided between the optical member and the quantum dot sheet.

A backlight unit according to an exemplary embodiment includes a light source emitting light, a light guide plate scattering the light emitted from the light source and irradiating the scattered light to a front surface of the backlight unit, a reflective sheet reflecting the light, which is irradiated to a rear surface of the light guide plate, to the light guide plate, a quantum dot sheet converting the light, which is irradiated to the front surface of the light guide plate, into a white light, and a light-converting material provided on an edge portion of thereof for converting the light into the white light at the edge portion of thereof.

According to an exemplary embodiment, the light-converting material may include a fluorescent material.

According to an exemplary embodiment, the light-converting material may be applied to the reflective sheet.

According to an exemplary embodiment, the light-converting material may be applied to the reflective sheet in an area defined by a width extending from a first end of the reflective sheet to a central portion of the reflective sheet.

According to an exemplary embodiment, an area of the applied light-converting material may be decreased as a distance from the first end of the reflective sheet to the central portion of the reflective sheet is increased.

According to an exemplary embodiment, a concentration of the light-converting material may be decreased as a distance from the first end of the reflective sheet to the central portion of the reflective sheet is increased.

A backlight unit according to an exemplary embodiment includes a light source to emit light, a light guide plate to scatter the light, a reflective sheet provided on the light guide plate to reflect the light; and a quantum dot sheet to output the light as a white light, where a light-converting material is provided on the backlight unit to convert the light at an edge portion of the backlight unit into the white light.

According to an exemplary embodiment, the backlight unit also includes an optical sheet provided on a front side of the quantum dot sheet and to irradiate visible light.

According to an exemplary embodiment, the light-converting material is provided on one from among the quantum dot sheet, the reflective sheet, and the optical sheet.

According to an exemplary embodiment, the light-converting material is provided on an area defined by an edge of the backlight unit and a central portion of the backlight unit.

According to an exemplary embodiment, the light-converting material includes a plurality of circles, the largest circles being at the edge of the backlight unit and decreasing in size toward the central portion of the backlight unit, with a space between the plurality of circles.

According to an exemplary embodiment, it is possible to provide the display device and the backlight unit which is provided with the light-converting material on the edge portion of the backlight unit to minimize a difference between the brightness of the light irradiated from the edge portion and the brightness of the light irradiated from the central portion and a difference between the color tone of the light irradiated from the edge portion and the color tone of the light irradiated from the central portion.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
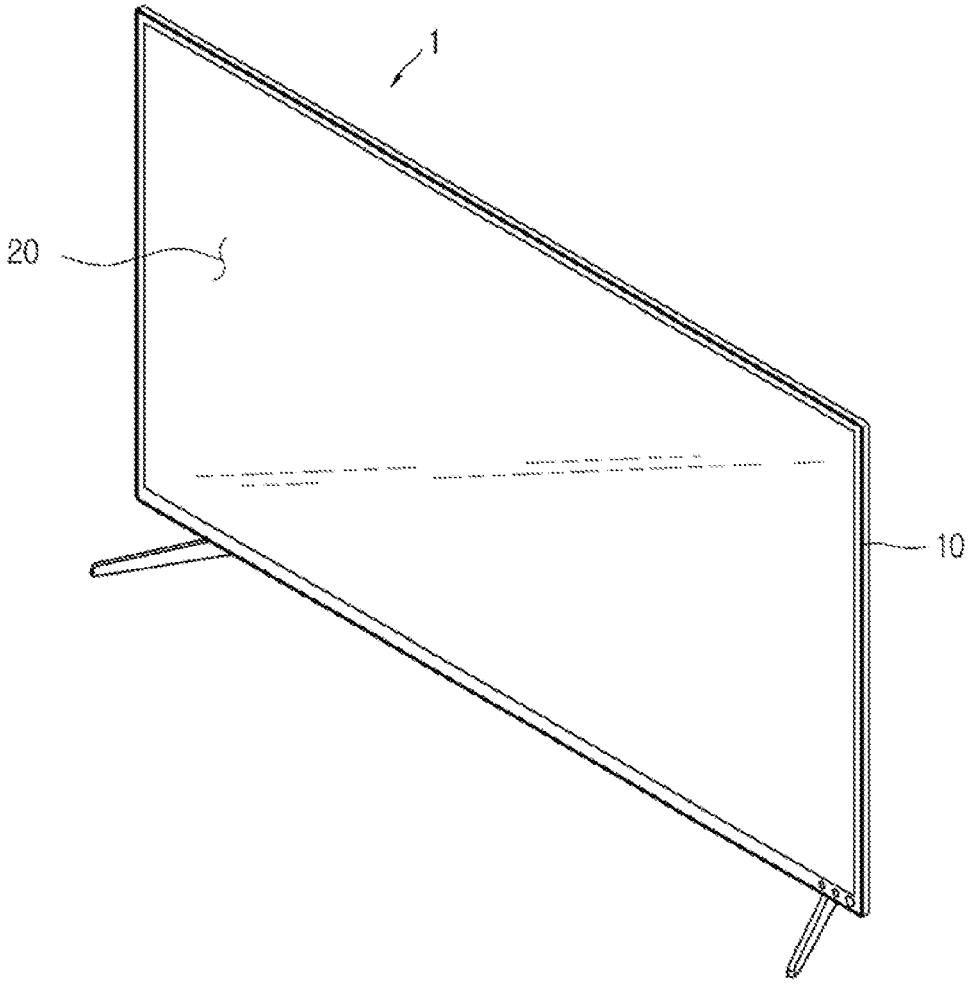
FIG. 1 is a view showing an external appearance of a display device according to an exemplary embodiment.

Reference will now be made in detail to exemplary embodiments, examples of which are illustrated in the accompanying drawings, wherein like reference numerals refer to like elements throughout. However, known functions associated with the exemplary embodiments or detailed descriptions on the configuration and other matters which would unnecessarily obscure the present disclosure will be omitted.

Figure 2:
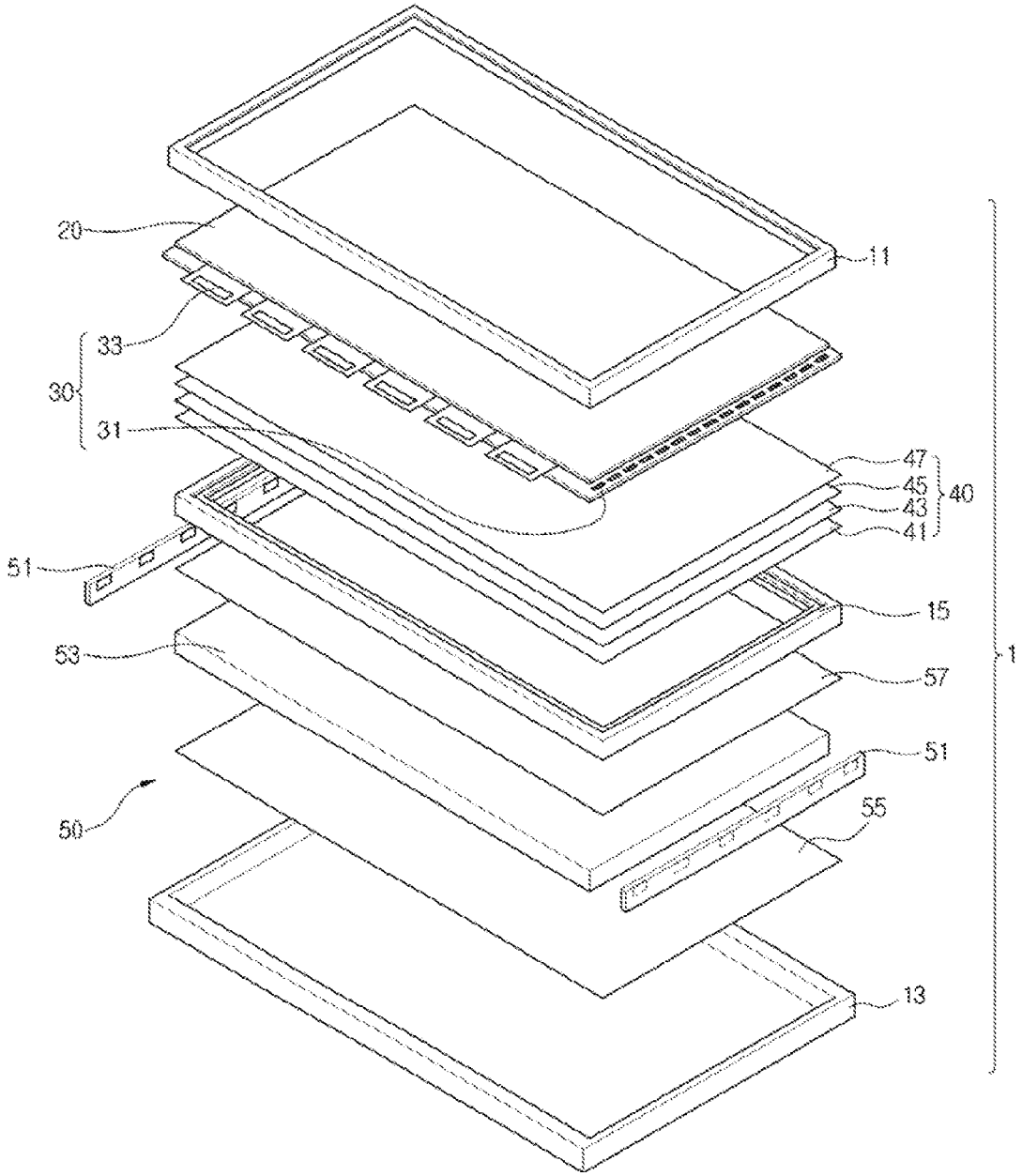
FIG. 2 is an exploded view of a display device according to an exemplary embodiment.
Figure 3:
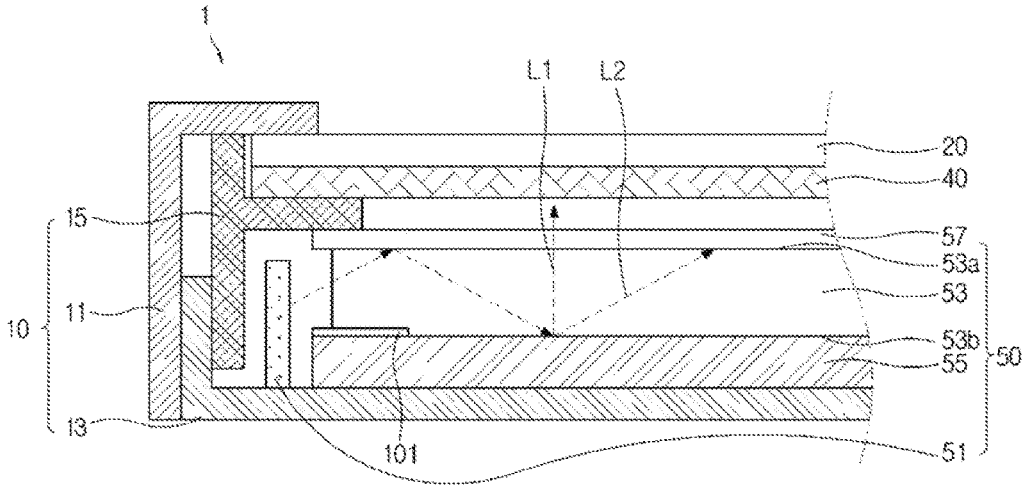
FIG. 3 is a view showing a side sectional view of a display device according to an exemplary embodiment.

FIG. 1 is a view showing an external appearance of a display device according to one embodiment of the disclosure, FIG. 2 is an exploded view of a display device according to one embodiment of the disclosure, and FIG. 3 is a side sectional view of a display device according to one embodiment of the disclosure.

The display device 1 is a device which can process an image signal received from the outside and visually display the processed image thereon. Hereinafter, although a television is described as one example of the display device 1, the disclosure is not limited thereto. For example, the display device 1 according to the disclosure may be realized as various forms of display devices such as a monitor, a portable multimedia device, a mobile telecommunication device, and the like, and if the display device 1 is a device which visually displays an image, the form thereof is not limited.

Referring to FIGS. 1-3, a display device 1 includes a main body 10 configured to accommodate various parts and a display panel 20 for displaying an image to a user U. In addition, a driving circuit 30, a backlight unit (BLU) 50, and an optical member 40 are provided in the main body 10.

The main body 10 may include a top chassis 11 provided on a front face of the display device 1, a bottom chassis 13 provided on a rear face of the display device, and a mold frame 15 provided in the display device 1.

The top chassis 11 is provided on a surface which is the same as a surface, on which the image is displayed, of the display panel 20 to prevent an edge portion of the display panel 20 from being exposed to an outside.

The bottom chassis 13 may be provided on a side opposite the display panel 20 to prevent various kinds of structural elements included in the display device 1 from being exposed to the outside, and protects the various structural elements included in the display device 1 from an external shock.

The mold frame 15 limits movements of the display panel 20, the optical member 40, and the backlight unit 50, and secures the display panel 20, the optical member 40, and the backlight unit 50 to the top chassis 11 and the bottom chassis 13.

The display panel 20 may display a variety of images according to the image signal input from the outside. The display panel 20 may be an emissive display panel in which a plurality of pixels constituting the display panel 20 emits light to generate an image or may be a non-emissive display panel in which a plurality of pixels reflect/transmit/block the light to generate the image.

Hereinafter, according to an exemplary embodiment, the display panel 20 is the non-emissive display panel in which the light emitted from the backlight unit 50 is reflected/transmitted/blocked to generate the image.

The display panel 20 may include a liquid crystal layer (not shown), a transparent electrode layer (not shown), a transparent substrate (not show), and a color filter array (not shown).

The liquid crystal layer contains an adequate amount of liquid crystal. The liquid crystal means an intermediate phase of crystal and liquid. Such liquid crystal may exhibit an optical property according to a change of a voltage. For example, the arrangement direction of molecules constituting the liquid crystal may be changed according to a change of an electric field applied to the liquid crystal.

A pair of transparent electrode layers are provided at both sides of the liquid crystal layer for forming the electric field on the liquid crystal layer. The electric field applied to the liquid crystal layer is changed is changed according to the voltage applied between the pair of transparent electrode layers.

The aforementioned transparent electrode layer may include a gate line (not shown), a data line (not shown), and a thin film transistor (TFT).

The gate line is arranged in a row direction to turn on or turn off the thin film transistor, and the data line is arranged in a column direction to transmit a data signal to the plurality of pixels through the thin film transistor. The electric field applied to the liquid crystal layer is changed according to a gate signal input through the gate line and the data signal input through the data line. The molecular arrangement of the liquid crystal is changed according to the change of the electric field. In addition, the light is transmitted through the liquid crystal layer or is blocked according to the molecular arrangement of the liquid crystal.

The gate line and the data line may be formed of indium tin oxide (ITO) or indium zinc oxide (IZO).

A pair of transparent substrates (not shown) form an external appearance of the display panel 20 and protect the liquid crystal layer and the transparent electrode layer. Such transparent substrates may be formed of tempered glass or a transparent film having an excellent light transmittance.

The color filter array may include a red color filter, a blue color filter, and a green color filter formed on areas corresponding to the pixels, respectively, so as to allow each of the plurality of pixels constituting the display panel 20 to show the colors.

As described above, the display panel 20 blocks or transmits the light emitted from the backlight unit 50 to generate the image. Specifically, each of the pixels constituting the display panel 20 blocks or transmits the light of the backlight unit 50 to generate the image having various colors.

The driving circuit 30 provides the display panel 20 with a driving signal for driving the display panel 20. The driving circuit 30 may include a gate driving circuit 31 and a data driving circuit 33.

The gate driving circuit 31 may be connected to the gate line (not shown) of the display panel 20 to transfer the gate signal to the gate line. Also, the data driving circuit 33 may be connected to the data line (not shown) of the display panel 20 to transfer the data signal to the data line.

The backlight unit 50 is installed at a rear side of the display panel 20 and emits the light for generating the image. The backlight unit 50 may be classified into an edge type backlight unit (BLU) in which a light source is placed at a side surface and a direct type backlight unit (BLU) in which the light source is placed at a rear side of the display panel 20.

Hereinafter, the edge type backlight unit in which the light source is placed at the side surface will be described as the backlight unit 50.

As shown in FIG. 3, the backlight unit 50 includes a light source 51, a light guide plate (LGP) 53 configured to convert the light emitted from the light source 51 into a sheet light, a reflective sheet 55 provided on a rear surface of the light guide plate 53 to reflect the light irradiated from the light guide plate 53, and a quantum dot sheet 57 receiving the light from the light guide plate 53 and outputting a white light (in which various color lights are mixed).

As shown in FIG. 3, the light source 51 is provided on a side surface of the light guide plate 53 to emit the light towards the light guide plate 53.

The light source 51 may emit the light (the monochromatic light) with a single wavelength (single color) or may emit the light (the white light) in which a plurality of lights with a plurality of wavelengths which differ from each other are mixed. In general, in the case in which the backlight unit 50 includes the quantum dot sheet 57, a light source emitting the monochromatic light (in particular, a blue-colored light with a short wavelength) is used as the light source. Hereinafter, a light source emitting the blue-colored light (hereinafter, "blue light") is described as the light source 51.

A light emitting diode (LED) or a cold cathode fluorescence lamp (CCFL) with a low calorific value may be employed as the light source 51.

In the edge type backlight unit 50, the light guide plate 53 changes the advancing direction of the light incident from a side surface and then irradiates the light towards a front surface. In order to change the advancing direction of the light, the light guide plate 53 may have a plurality convex stripes formed on a front surface 53a thereof and a plurality of dots formed on a rear surface 53b thereof. Also, in order to allow the light to be uniformly irradiated to the front surface 53a of the light guide plate 53, a dimension of the convex stripe and a gap between the stripes may be adjusted and a dimension of the dot and a gap between the dots may be adjusted.

In addition, the convex stripe on the front surface 53a of the light guide plate 53 may be convexly formed by a printing method and the dot on the rear surface 53b of the light guide plate 53 may be concavely formed by a laser.

As shown in FIG. 3, a part L1 of the light incident on the light guide plate 53 is scattered by the dots formed on the rear surface 53b of the light guide plate 53 and may be irradiated to the front surface 53a of the light guide plate 53, and another part L2 of the light incident on the light guide plate is reflected into the light guide plate 53 by the reflective sheet 55 provided on the rear surface 53b of the light guide plate 53. In addition, the reflected part L2 may be irradiated to a central portion of the light guide plate 53, and may be scattered at the central portion of the light guide plate 53 and then irradiated to the front surface 53a of the light guide plate 53.

Due to the refraction, reflection, and scattering of the light in the light guide plate 53, the light guide plate 53 may irradiate the uniform light to the front surface thereof.

The aforementioned light guide plate 53 may be formed of polymethylmethacrylate (PMMA) or transparent polycarbonate (PC) which is transparent and has an excellent strength.

The reflective sheet 55 is provided on the rear surface 53b of the light guide plate 53 described above. In the light guide plate 53, the reflective sheet 55 reflects some of the light which is being irradiated toward the rear surface of the light guide plate 53 into the light guide plate 53.

The reflective sheet 55 is fabricated by coating a base material with a material having a high reflectivity. For example, the reflective sheet 55 may be fabricated by coating a base material such as polyethylene terephthalate (PET) with a polymer having a high reflectivity.

As shown in FIG. 3, a light-converting material 101 is applied to an edge portion of the reflective sheet 55. The light-converting material 101 is a material which emits visible light when the light is incident from the outside and may include a fluorescent material or a quantum dot.

Once the light is incident from the light guide plate 53 to the edge portion of the reflective sheet 55, some of the incident light is converted into the white light by the light-converting material 101, and the light reflected by the reflective sheet 55 and the white light converted by the light-converting material 101 are irradiated together.

The light-converting material 101 applied to the edge portion of the reflective sheet 55 will be described in more detail below.

The quantum dot sheet 57 converts the light irradiated to the front surface 53a of the light guide plate 53 into the white light.

The quantum dot means a small-spherical shaped semiconductor particle having being a nanometer (nm, $1/1{,}000{,}000{,}000$ meter) in size, and may include a central body with a size of approximately 2 nanometers [nm] to 10 [nm] and a shell formed of zinc sulfide (ZnS). Cadmium selenide (CdSe), cadmium telluride (CdTe), or cadmium sulfide (CdS) may be employed as a material for the central body of the quantum dot.

Once voltage is applied, the quantum dot emits the light by itself or absorbs the light to emit the light with a specific wavelength.

An electron of the quantum dot in a stable state is located at a low energy level (or a low energy band). At this time, once the quantum dot absorbs the light from the outside, the electron at the low energy level is transferred to a high energy level (or a high energy band). Since the electron at the high energy level is unstable, the electron is naturally transferred from the high energy level to the low energy level. During a transfer from the high energy level to the low energy level, the electron emits the light corresponding to an energy difference between the high energy level to the low energy level. A wavelength of the emitted light is determined by the energy difference between the high energy level to the low energy level.

A size of the quantum dot may be proportional to a wavelength of the light to be emitted. For example, the quantum dot having a diameter of 2 nanometers [nm] may emit the blue-colored light and the quantum dot having a diameter of approximately 10 nanometers [nm] may emit a red-colored light.

In addition, by using the quantum dots having various sizes, it is possible for the quantum dots to emit light of varying wavelengths from the red light to the blue light. Once the quantum dots having various sizes are employed, the light having a natural color (white light) can be generated.

The quantum dot sheet 57 may be manufactured by distributing the quantum dots on resin.

Once the light is incident from the light guide plate 53 to the quantum dot sheet 57, the incident light excites the electron of the quantum dot contained in the quantum dot sheet 57. In other words, the electron at the low energy level (or the low energy band) is transferred to the high energy level (or the high energy band) by the incident light.

Subsequently, while the excited electron is transferred from the high energy level to the low energy level, the quantum dot emits the light (the white light) with various wavelengths. The light having various wavelengths may pass through the optical member 40 and the display panel 20 to generate the image.

The backlight unit 50 may include the light source 51, the light guide plate 53, the reflective sheet 55, and the quantum dot sheet 57 to irradiate a uniform sheet light.

The optical member 40 refracts or scatters the light so as to widen a viewing angle of the display device 1 and to enhance brightness of the display device 1.

The optical member 40 may include a variety of sheets. For example, the optical member 40 may include a diffusion sheet 41, a prism sheet 43, a protective sheet 45, and a dual brightness enhancement film (DBEF) 47.

The diffusion sheet 41 diffuses the light emitted from the backlight unit 50 along a surface to make a color and brightness on a screen of the display device 1 entirely uniform. Since the light irradiated from the light guide plate 53 is irradiated through patterns formed on the front surface 53a of the light guide plate 53, the patterns formed on the front surface 53a of the light guide plate 53 is visible from the light irradiated from the light guide plate 53.

In order to prevent the patterns formed on the front surface 53a of the light guide plate 53 from being seen from the light irradiated from the light guide plate 53, the diffusion sheet 41 diffuses the irradiated light from the light guide plate 53 in a direction which is perpendicular to the irradiation direction.

The diffusion sheet diffuses the light emitted from the backlight unit 50 to uniformly maintain the brightness on the entire surface.

Since the light having passed through the diffusion sheet 41 is diffused in the direction perpendicular to a surface of the diffusion sheet 41, the brightness is rapidly decreased. The prism sheet 43 refracts or collects the light diffused by the diffusion sheet 41 to increase the brightness.

In addition, the prism sheet 43 includes a triangular prism-shaped prism pattern and a plurality of prism patterns are adjacently disposed to each other to form a plurality of bands. The prism patterns form lines in the form of a pattern in which hills and valleys are alternately and repeatedly disposed, and protrude toward the display panel 20.

The protective sheet 45 protects all kinds of structural elements included in the backlight unit 50 from an external shock or an inflow of foreign substances. In particular, a scratch is easily generated on the prism sheet 43 and the protective sheet 45 prevents this scratch from being generated on the prism sheet 43.

The dual brightness enhancement film 47 is one kind of a polarizing film and is also called a reflective polarizing film. Such a dual brightness enhancement film 47 transmits polarized light in the light irradiated from the backlight unit 50, which is parallel to a polarization direction of the dual brightness enhancement film 47, and reflects the light which is polarized in a direction opposite to the polarization direction of the dual brightness enhancement film 47.

It is known that the light is a transverse wave which is vibrated in a direction perpendicular to an advancing direction of the light. When the light is vibrated in various directions, the light vibrated in a specific direction is transmitted through a polarizing film and the light vibrated in another direction is absorbed by the polarizing film.

As compared with the polarizing film, the dual brightness enhancement film 47 reflects the light which is polarized in the direction opposite to the polarization direction of the dual brightness enhancement film 47. Here, the reflected light is recycled in the backlight unit 50 and the brightness of the display device 1 is enhanced by the light recycling.

The light recycling is described in detail below.

Figure 4:
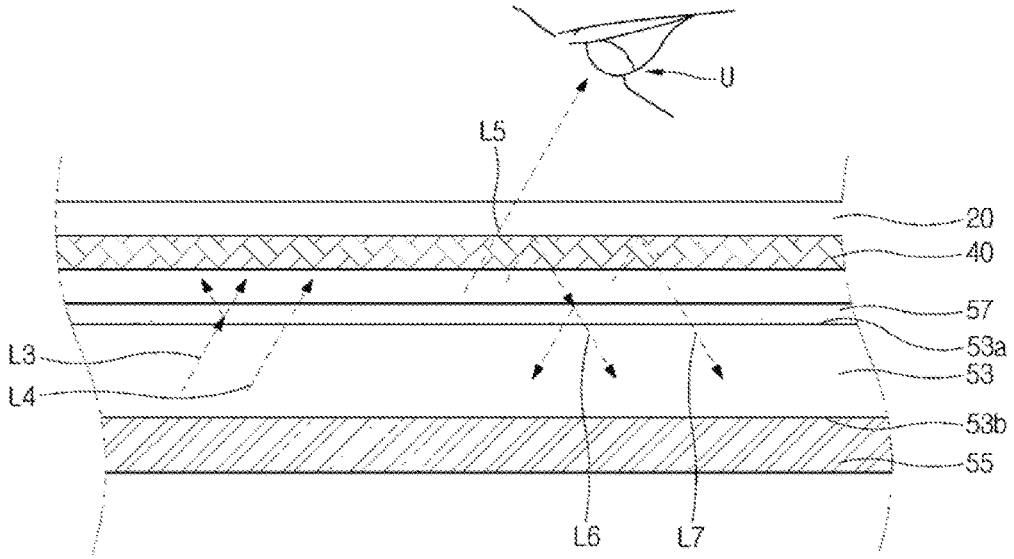
FIG. 4 is a view showing a light recycling at a central portion of a display device according to an exemplary embodiment.

FIG. 4 shows the light recycling at a central portion of the display device according to an exemplary embodiment.

As shown in FIG. 4, various optical phenomena are generated at the central portion of the display device 1.

As previously described, lights L3 and L4 scattered on the rear surface 53b of the light guide plate 53 are irradiated toward the quantum dot sheet 57.

At this time, at least some of light L3 irradiated from the light guide plate 53 is absorbed in the quantum dot sheet 57, and the light may excite the electron contained in the quantum dot of the quantum dot sheet 57. While returning to the stable state, the electron of the quantum dot, which is excited by the light, may irradiate the light with various wavelengths (the white light).

Due to at least some of light L3 of the lights L3 and L4 being irradiated from the light guide plate 53, the quantum dot sheet 57 may irradiate the while light.

In addition, another light L4 of the lights L3 and L4 irradiated from the light guide plate 53 is not absorbed in the quantum dot sheet 57, but may be transmitted through the quantum dot sheet 57. Since the quantum dot sheet 57 is manufactured by distributing the quantum dots on the resin, a sufficient space is formed between the quantum dots so that the light irradiated from the light guide plate 53 may be transmitted through the quantum dot sheet 57 via the space between the quantum dots.

As described above, the light irradiated from the quantum dot sheet 57 includes the white light generated by the quantum dot sheet 57 and the light transmitted through the quantum dot sheet 57. If the light irradiated from the light guide plate 53 is the blue light emitted from the light source 51, the light irradiated from the quantum dot sheet 57 also becomes the light including a blue color.

Some of light L5 of lights L5, L6, and L7 irradiated from the quantum dot sheet 57 may be transmitted through the optical member 40 and the display panel 20 and may be output to the outside of the display device 1. Specifically, the light L5 polarized in the direction which is same as the polarization direction of the dual brightness enhancement film 47 included in the optical member 40 may be transmitted through the optical member 40 and may be output to the outside of the display device 1 by driving the display panel 20.

The light L5 output to the outside of the display device 1 may form the image to be output by the display device 1.

In addition, some of lights L6 and L7 of the lights L5, L6, and L7 irradiated from the quantum dot sheet 57 are reflected from the dual brightness enhancement film 47 and are then incident on the backlight unit 50 again. Specifically, the lights L6 and L7 polarized in a direction which differs from the polarization direction of the dual brightness enhancement film 47 included in the optical member 40 are reflected from the dual brightness enhancement film 47 and are incident on the backlight unit 50.

Some of light L6 of the lights L6 and L7 reflected from the optical member 40 and entering the backlight unit 50 is absorbed in the quantum dot sheet 57 and may excite the electron included in the quantum dot of the quantum dot sheet 57. Also, while returning to the stable state, the electron of the quantum dot, which is excited by the light, may irradiate the lights with various wavelengths (the white light).

Some light L7 of the lights L6 and L7 reflected from the optical member 40 and entering the backlight unit 50 is not absorbed in the quantum dot sheet 57 and may be transmitted through the quantum dot sheet 57. Specifically, the light reflected from the optical member 40 may be transmitted through the quantum dot sheet 57 via the space between the quantum dots included in the quantum dot sheet 57.

The light reflected from the dual brightness enhancement film 47 and entering the backlight unit 50 may be recycled in the backlight unit 50 to enhance the luminance of the backlight unit 50.

While the light is recycled, the light passes repeatedly through the quantum dot sheet 57. In addition, some of lights L3 and L6 of the lights L3, L4, L6, and L7 are absorbed in the quantum dot of the quantum dot sheet 57, and the quantum dot sheet 57 may irradiate the white light due to the light absorbed in the quantum dot.

In other words, while the light is recycled in the backlight unit 50, the white light is gradually increased.

In general, the light source 51 of the backlight unit 50 emits the monochromatic light (in particular, the blue light) with a single wavelength (single color). Although the light which is initially emitted from the light source 51 is the monochromatic light, the monochromatic light is gradually converted into the white light while the light is recycled in the backlight unit 50, in which the lights with various wavelengths (various colors) are mixed.

As a result, most of the lights output from the backlight unit 50 become the white light.

Since the white light includes the lights with a plurality of wavelengths (various color), it is possible to enhance a color reproduction range of the display device 1.

In this way, the backlight unit 50 can output the white color through the light recycling at the central portion of the display device 1. Due to a lack of the light recycling, the white light including the blue color may be output from the edge portion of the display device 1.

Figure 5:
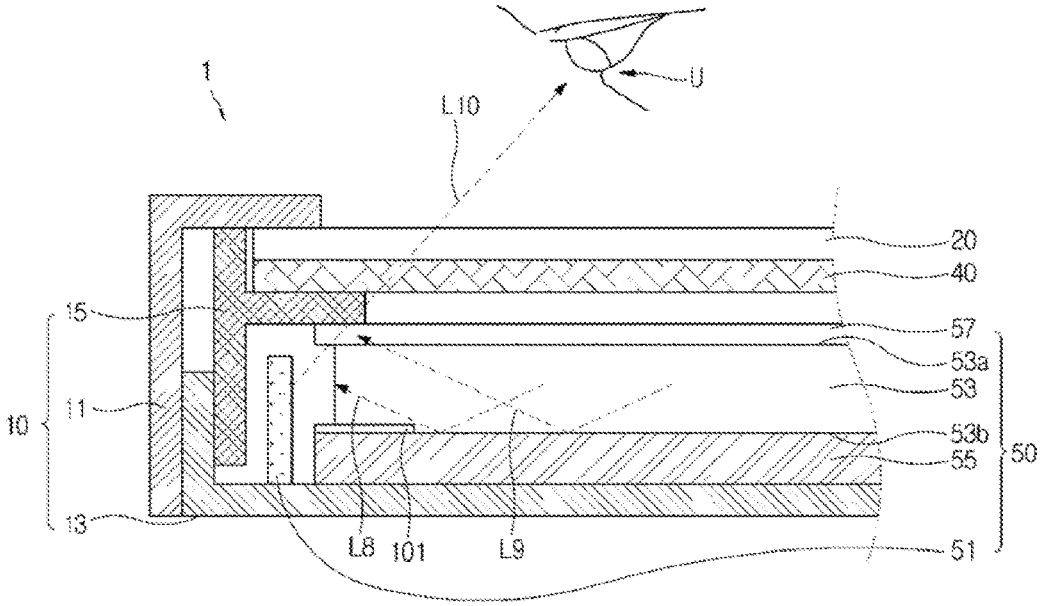
FIG. 5 is a view showing blue light output from an edge portion of a display device according to an exemplary embodiment.
Figure 6:
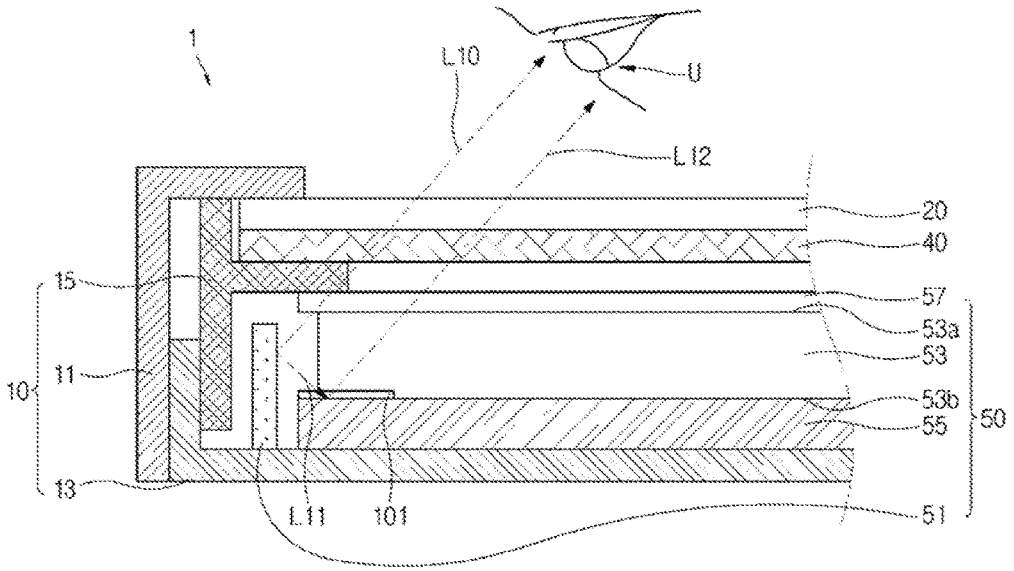
FIG. 6 is a view showing a process for compensating blue light output from an edge portion of a display device according to an exemplary embodiment.

FIG. 5 shows the blue light output from the edge portion of the display device according to an exemplary embodiment, and FIG. 6 shows a process for compensating the blue light output from the edge portion of the display device according to an exemplary embodiment.

The edge portion is a portion between the edge of the backlight unit 50, the light guide plate 53, the reflective sheet 55, and the quantum dot sheet 57, and a portion spaced apart from the above edge at a specific distance toward a center of the above member. A width of the edge portion of the backlight unit 50, the light guide plate 53, the reflective sheet 55, and the quantum dot sheet 57 is not a predetermined value, but may be varied according to widths of the backlight unit 50, the light guide plate 53, the reflective sheet 55, and the quantum dot sheet 57.

The light recycling which is previously described is also generated at the edge portion of the display device 1. Some of the light irradiated from the quantum dot sheet 57 is reflected by the dual brightness enhancement film 47 of the optical member 40 at the edge portion of the display device 1 and some of the light transmitted through the quantum dot sheet 57 is converted into the white light.

However, the light recycling at the edge portion of the display device 1 is less than that at the central portion of the display device 1.

At the edge portion of the display device 1, as shown in FIG. 5, some light L8 of the recycled light may be irradiated to a side surface of the light guide plate 53 and some light L9 of the recycled light may be absorbed by the mold frame 15. At the edge portion of the display device 1, some of lights L8 and L9 of the recycled light is not irradiated to the front surface 53a of the light guide plate 53, and instead becomes lost.

Therefore, the white light generated by the light recycling is decreased at the edge portion of the display device 1.

As shown in FIG. 5, some of light L10 of the monochromatic light (the blue light) emitted from the light source 51 may pass through the light guide plate 53, the quantum dot sheet 57, the optical member 40, and the display panel 20 at the edge portion of the display device 1, and be then irradiated to the outside of the display device 1.

In the light irradiated from the display device 1, as a result, a ratio of the white light caused by the light recycling is decreased and a ratio of the monochromatic light (the blue light) emitted from the light source 51 is increased. In addition, the image output from the display device 1 looks blue at the edge portion of the display device 1.

If the ratio of the white light is decreased and the ratio of the monochromatic light (the blue light) is increased in the light irradiated from the edge portion of the display device 1 as above, a difference of the color (a color coordinate) between the light irradiated from the edge portion of the display device 1 and the light irradiated from the central portion of the display device 1 is generated.

For example, when the light source 51 emits the blue light, as compared with the central portion of the display device 1, the edge portion of the display device 1 looks more blue. This phenomenon is called a Mura effect of the display device 1.

In order to prevent the Mura effect, as shown in FIG. 6, the light-converting material 101 may be applied to the edge portion of the reflective sheet 55. Here, the fluorescent material or the quantum dot which emits a light having a specific wavelength when the light is incident from the outside may be employed as the light-converting material 101.

Specifically, an electron of the light-converting material 101 in a stable state is located at a low energy level (or a low energy band), and once the light-converting material 101 absorbs the light from the outside, the electron at the low energy level is transferred to a high energy level (or a high energy band). Since the electron at the high energy level is unstable, the electron is naturally transferred from the high energy level to the low energy level. During a transfer from the high energy level to the low energy level, the electron emits energy in the form of light. Also, a wavelength of the emitted light is determined by an energy difference between the high energy level and the low energy level.

When the light emitted from the light source 51 or the light recycled in the backlight unit 50 is absorbed in the light-converting material 101, the light-converting material 101 cannot irradiate the light.

If the light-converting material 101 can irradiate a yellow light and the red light, the yellow light and the red light irradiated from the light-converting material 101 and the blue light transmitted through the light-converting material 101 are mixed to irradiate the white light from the light-converting material 101.

When the blue light is incident toward the light-converting material 101 from the light source 51 as shown in FIG. 6, the light-converting material 101 may generate the yellow light and the red light using the blue light. Also, some of the blue light emitted from the light source 51 may be transmitted through the light-converting material 101.

The yellow light and the red light generated by the light-converting material 101 is mixed with the blue light transmitted through the light-converting material 101 so that light L12 irradiated from the light-converting material 101 becomes the white light with various wavelengths (various colors).

The white light generated by the light-converting material 101 applied to the edge portion of the reflective sheet 55 may increase the ratio of the white color at the edge portion of the backlight unit 50. In other words, the light-converting material 101 applied to the edge portion of the reflective sheet 55 may compensate for a lack of the light recycling at the edge portion of the backlight unit 50.

In order to compensate for the lack of the light recycling at the edge portion of the backlight unit 50, the light-converting material 101 is applied to the edge portion of the reflective sheet 55 included in the backlight unit 50.

In addition, although the light-converting material 101 applied to a front surface of the reflective sheet 55 is described above, the disclosure is not limited thereto, and the light-converting material 101 may be applied to the rear surface 53b of the light guide plate 53. In other words, the light-converting material 101 may be located between the light guide plate 53 and the reflective sheet 55.

A pattern of the light-converting material 101 applied to the edge portion of the reflective sheet 55 is described below.

Figure 7:
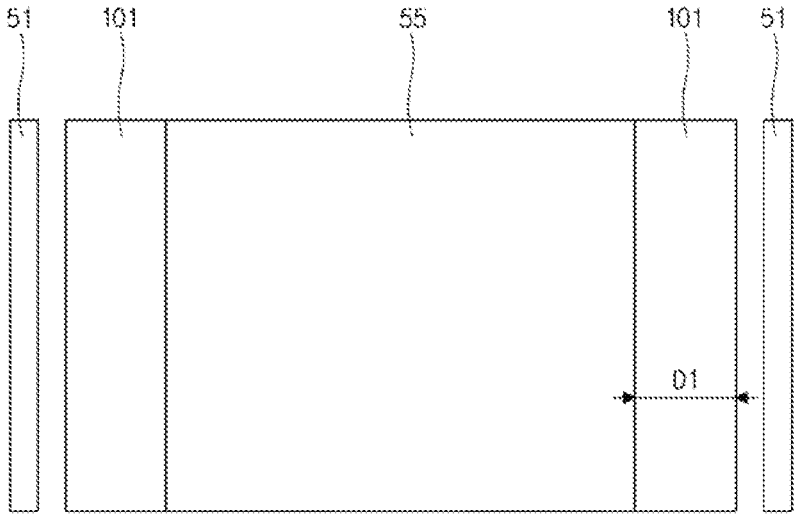
FIG. 7 shows two views, (a) and (b) of a light-converting material being applied to a reflective sheet of a display device according to an exemplary embodiment.
Figure 7:
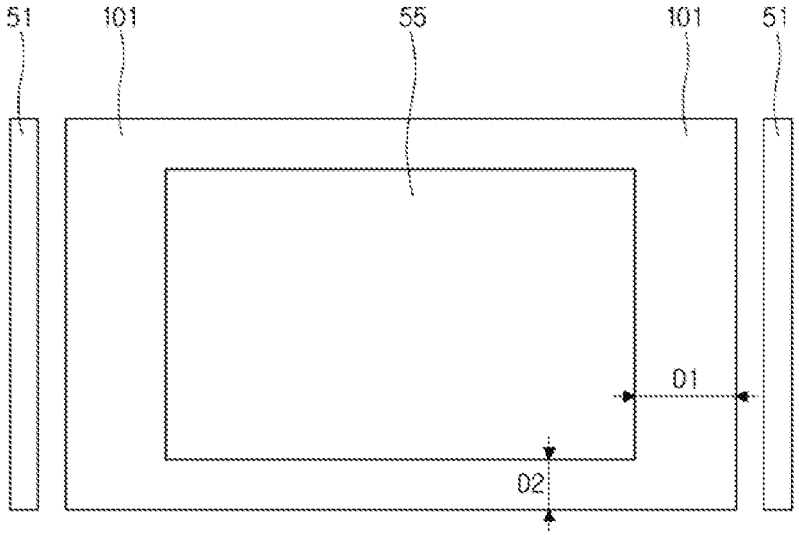

FIG. 7 shows one example in which the light-converting material is applied to the reflective sheet of the display device according to an exemplary embodiment.

As shown in view (a) of FIG. 7, the light-converting material 101 may be applied to a region of the edge portion of the reflective sheet 55, which is adjacent to the light source 51. The light-converting material 101 is applied to this region because there is a lack of the light recycling at the edge portion of the backlight unit 50, which corresponds to the light source 51, and the light emitted from the light source 51 can be transmitted through the quantum dot sheet 57 and can be irradiated.

A width D1 of the region to which the light-converting material 101 is applied may be variably adjusted.

Specifically, the width D1 of the region to which the light-converting material 101 is applied may be adjusted according to a distance between the light source 51 and the light guide plate 53, a width of a portion at which the mold frame 15 and the light guide plate 53 are overlapped, and a thickness of the quantum dot sheet 57.

If the width of the overlapping portion of the mold frame 15 and the light guide plate 53 is small, the amount of the light which is blocked by the mold frame 15 is reduced, so the width D1 of the region to which the light-converting material 101 is applied may be decreased. In contrast, if the width of the overlapping portion of the mold frame 15 and the light guide plate 53 is large, the amount of the light which is blocked by the mold frame 15 is increased, so the width D1 of the region to which the light-converting material 101 is applied may be increased.

If the distance between the light source 51 and the light guide plate 53 is large, the amount of the light which is emitted from the light source 51 and is directly transmitted through the quantum dot sheet 57 is decreased, so the width D1 of the region to which the light-converting material 101 is applied may be decreased. In contrast, if the distance between the light source 51 and the light guide plate 53 is small, the amount of the light which is emitted from the light source 51 and is directly transmitted through the quantum dot sheet 57 is increased, so the width D1 of the region to which the light-converting material 101 is applied may be increased.

Exemplary embodiments are not limited to the configuration in which the light-converting material 101 is applied to the edge portion at which the light source 51 is provided.

As shown in view (b) of FIG. 7, the light-converting material 101 may be applied to the edge portion at which the light source 51 is not provided.

At the edge portion of the backlight unit 50 at which the light source 51 is not provided, the light emitted from the light source 51 is transmitted through the quantum dot sheet 57 and the optical member 40, but is not irradiated to the outside of the display device 1.

At the edge portion of the backlight unit 50 at which the light source 51 is not provided, the light in the light guide plate 53 is irradiated to a side face of the light guide plate 53 or the light irradiated from the light guide plate 53 may be blocked by the mold frame 15. Therefore, there is a lack of light recycling at the edge portion of the backlight unit 50 at which the light source 51 is not provided, and the ratio of the white light at the edge portion of the backlight unit 50 at which the light source 51 is not provided is less than that at the central portion of the backlight unit 50. As a result, the image output from the display device 1 looks blue at the edge portion of the display device 1.

For this reason, the light-converting material 101 may be applied to the edge portion of the reflective sheet 55, at which the light source 51 is not provided as shown in view (b) of FIG. 7. A width D2 of the light-converting material 101 applied to the edge portion at which the light source 51 is not provided may be smaller than the width D1 of the light-converting material 101 applied to the edge portion at which the light source 51 is provided.

Figure 8:
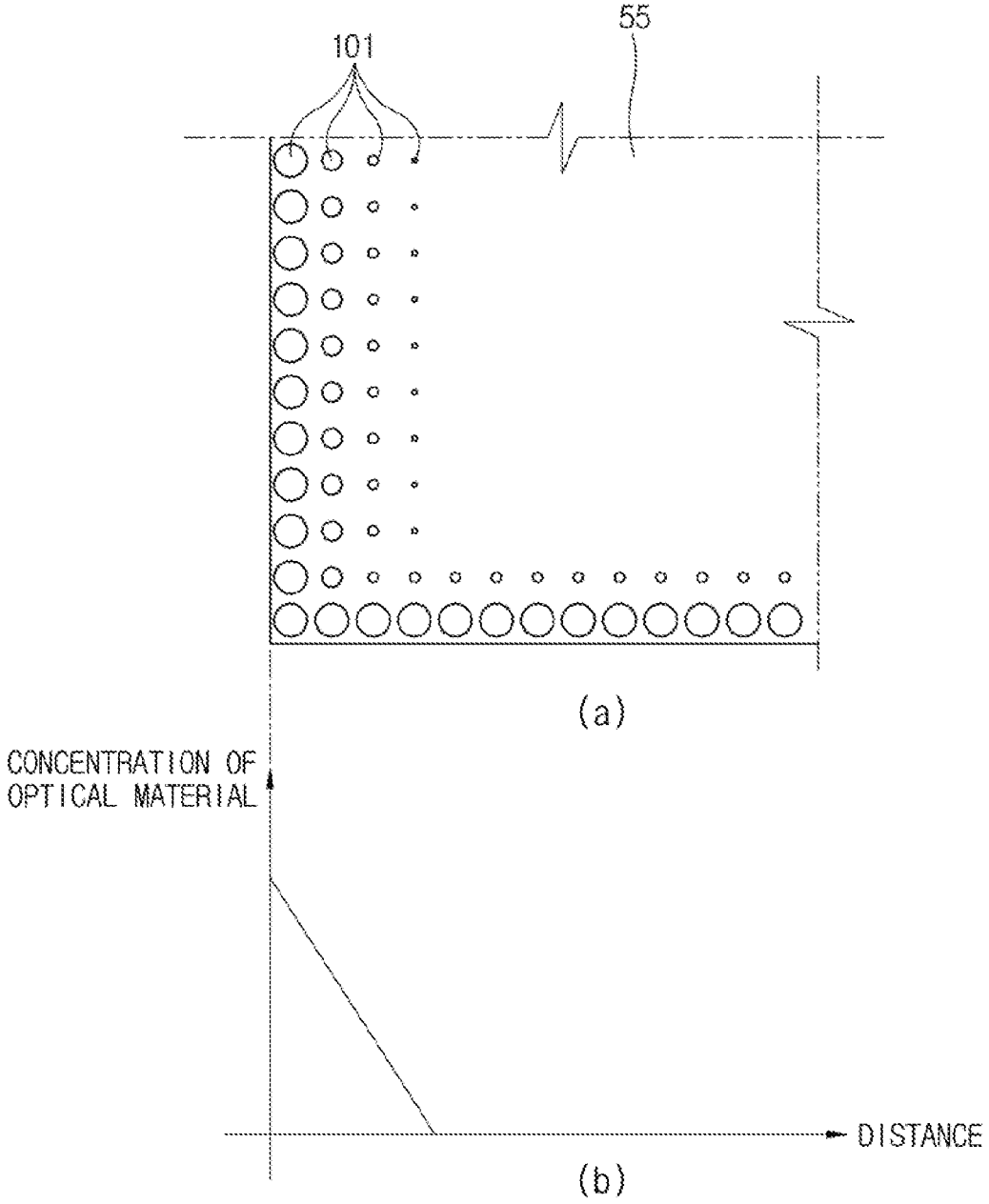
FIG. 8 shows two views, (a) and (b), showing a density of a light-converting material applied to a reflective sheet of a display device according to an exemplary embodiment.

FIG. 8 shows a density of the light-converting material applied to the reflective sheet of the display device according to an exemplary embodiment.

As previously described, a lack of the light recycling increases from the central portion toward the edge portion of the backlight unit 50. In other words, the light recycling decreases from the center of the backlight unit 50 toward the edge portion of the backlight unit 50.

In order to compensate for the lack of the light recycling, a density of the applied light-converting material 101 may vary according to a location.

Specifically, since the least amount of light recycling occurs at the edge of the backlight unit 50, causing the strongest monochromatic light (the blue light) to be irradiated and the light recycling is increased as a distance from the edge of the backlight unit 50 increases so that the ratio of the white light is increased, the density of the applied light-converting material 101 may be decreased according to a distance from the edge portion of the backlight unit 50.

As shown in view (a) of FIG. 8, when the light-converting material 101 is applied to the reflective sheet 55 in a circular pattern, the light-converting material 101 may be applied in the largest circular shape at the edge of the reflective sheet 55 and a circular area of the light-converting material 101 may decrease as a distance from the edge of the reflective sheet 55 is increased, Although not shown in the drawing, the circular area of the light-converting material 101 may be maintained and a gap between the circular shapes of the light-converting material 101 may vary. For example, the gap between the circular shapes of the light-converting material 101 applied to the edge of the reflective sheet 55 is narrow, and the gap between the circular shapes of the light-converting material 101 may increase as the distance from the edge of the reflective sheet 55 is increased.

As shown in view (b) of FIG. 8, the light-converting material 101 having the highest concentration may be applied to the edge of the reflective sheet 55, and the concentration of the light-converting material 101 may be reduced as the distance from the edge of the reflective sheet 55 is increased.

By varying the density of the light-converting material 101 according to the distance from the edge of the backlight unit 50 as described above, it is possible to compensate for the decreased light recycling and prevent reduction of the brightness at the edge portion of the backlight unit 50 by the light-converting material 101.

Figure 9:
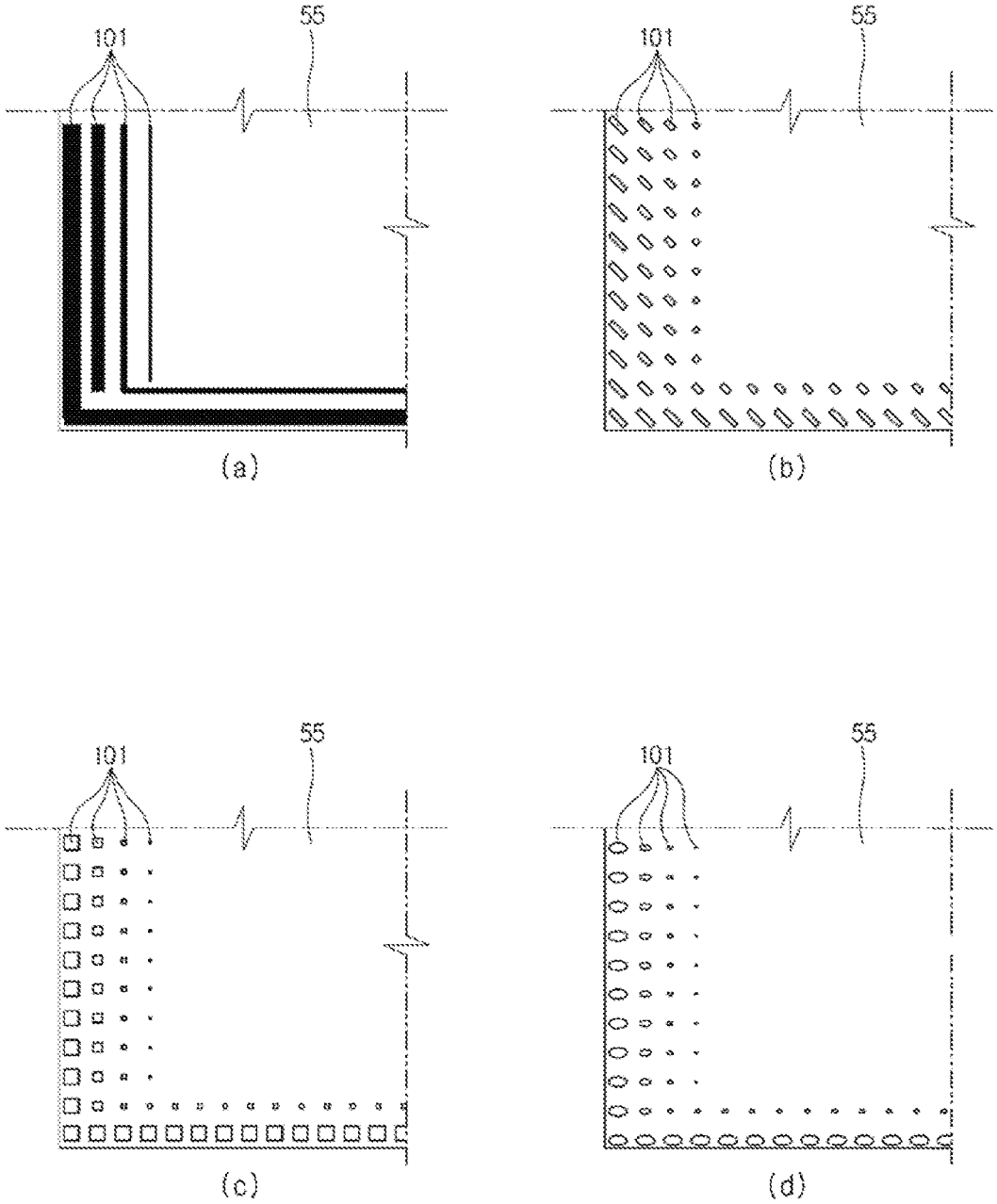
FIG. 9 shows four views, (a), (b), (c), and (d), showing a pattern of a light-converting material applied to a reflective sheet of a display device according to an exemplary embodiment.

FIG. 9 shows a pattern of the light-converting material applied to the reflective sheet of the display device according to an exemplary embodiment.

The light-converting material 101 may be applied in various patterns to the reflective sheet 55. For example, as shown in view (a) FIG. 8, the light-converting material 101 may be applied in a circular pattern to the reflective sheet 55.

As shown in view (a) of FIG. 9, the light-converting material 101 may be applied in a stripe pattern to the reflective sheet 55. A width of the stripe pattern may be varied according to the distance from the edge of the reflective sheet 55. For example, the stripe pattern located at the edge of the reflective sheet 55 has the largest width and the width of the stripe pattern may be decreased as the distance from the edge of the reflective sheet 55 is increased.

In addition, the width of the stripe pattern is constantly maintained, but a gap between the stripe patterns may be varied. For example, the gap between the stripe patterns located at the edge of the reflective sheet 55 is narrowest and the gap between the stripe patterns may be increased as the distance from the edge of the reflective sheet 55 is increased.

As shown in view (b) of FIG. 9, the light-converting material 101 may be applied in a comb pattern to the reflective sheet 55. A length of the comb pattern may vary according to the distance from the edge of the reflective sheet 55. For example, the length of the comb pattern located at the edge of the reflective sheet 55 is longest and the length of the comb pattern may be shortened as the distance from the edge of the reflective sheet 55 is increased.

In addition, the length of the comb pattern is constant, but a gap between the comb patterns may be varied. For example, the gap between the comb patterns located at the edge of the reflective sheet 55 is narrowest and the gap between the comb patterns may be increased as the distance from the edge of the reflective sheet 55 is increased.

As shown in view (c) of FIG. 9, the light-converting material 101 may be applied in a polygonal pattern to the reflective sheet 55. Although view (c) of FIG. 9 shows a rectangular pattern, the shape of the polygonal pattern is not limited thereto, and various patterns such as a triangular pattern, a pentagonal pattern, and the like are available. An area of the polygonal pattern may vary according to the distance from the edge of the reflective sheet 55. For example, the polygonal pattern located at the edge of the reflective sheet 55 has the largest area and the area of the polygonal pattern may be decreased as the distance from the edge of the reflective sheet 55 is increased.

In addition, the area of the polygonal pattern is constantly maintained, but a gap between the polygonal patterns may be varied. For example, the gap between the polygonal patterns located at the edge of the reflective sheet 55 is narrowest and the gap between the polygonal patterns may be increased as the distance from the edge of the reflective sheet 55 is increased.

In addition, as shown in view (d) of FIG. 9, the light-converting material 101 may be applied in an elliptical pattern to the reflective sheet 55. Although view (d) of FIG. 9 shows the elliptical pattern having a major axis extending in a horizontal direction, the elliptical pattern having the major axis extending in a vertical direction or a diagonal direction is available. An area of the elliptical pattern may vary according to the distance from the edge of the reflective sheet 55. For example, the elliptical pattern located at the edge of the reflective sheet 55 has the largest area and the area of the elliptical pattern may be decreased as the distance from the edge of the reflective sheet 55 is increased.

In addition, the area of the elliptical pattern is constantly maintained, but a gap between the elliptical patterns may be varied. For example, the gap between the elliptical patterns located at the edge of the reflective sheet 55 is narrowest and the gap between the elliptical patterns may be increased as the distance from the edge of the reflective sheet 55 is increased.

Figure 10:
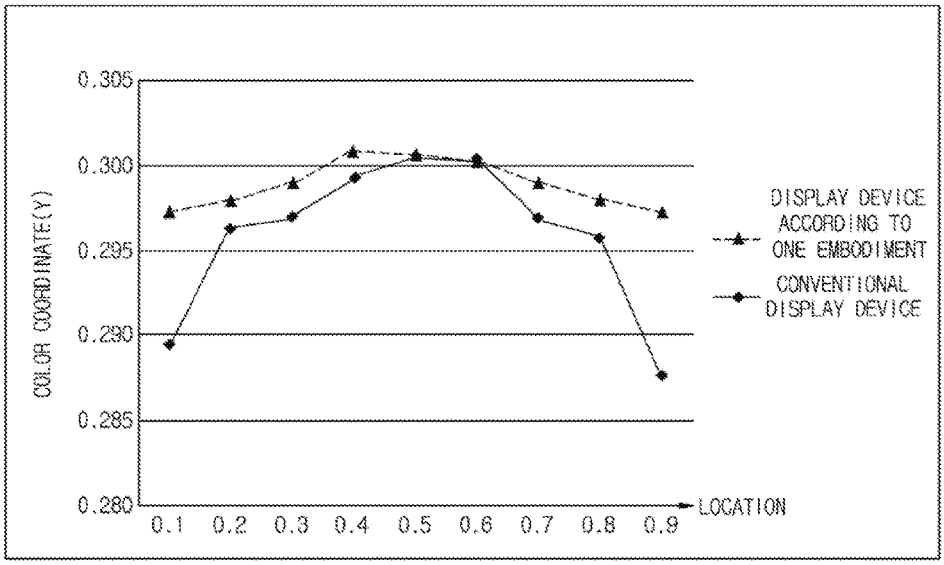
FIG. 10 is a view comparing a color coordinate of a display device according to an exemplary embodiment with a conventional display device.

FIG. 10 is a graph comparing a color coordinate of the display device according to an exemplary embodiment with that of a conventional display device.

Specifically, FIG. 10 shows the color coordinate (Y-coordinate) according to a location of the display device 1 according to an exemplary embodiment and the color coordinate (Y-coordinate) according to a location of the display device of the conventional art. The display device according to the conventional art is a display device in which a light-converting material (fluorescent material) is not applied to an edge portion of a reflective sheet.

The X-axis in the graph shown in FIG. 10 represents a value obtained by dividing a distance between one side edge and the other side edge of the display device by a width of the display device. In other words, the X-axis represents a relative location with respect to an entire width of the display device.

The Y-axis in the graph shown in FIG. 10 represents the color coordinate (Y coordinate) of the light output from the display device. As is widely known, the larger the Y coordinate of the color coordinate is, the closer the light is to the green light end of the spectrum, and the smaller the Y coordinate of the color coordinate is, the closer the light is to the blue light end of the spectrum.

One of the points to be noted in FIG. 10 is a deviation of the color coordinate (Y coordinate). In other words, if there is a wide deviation between the color coordinate (Y coordinate) of the central portion and the color coordinate (Y coordinate) of the edge portion of the display device, the user U may judge that the central portion differs from the edge portion of the display device based on the color.

Referring to FIG. 10, in the conventional display device, the deviation between the color coordinate (Y coordinate) of the central portion and the color coordinate (Y coordinate) of the edge portion of the display device is approximately "0.013". In the display device according to an exemplary embodiment, the deviation between the color coordinate (Y coordinate) of the central portion and the color coordinate (Y coordinate) of the edge portion of the display device is approximately "0.004".

Accordingly, compared with the conventional display device, the display device according to an exemplary embodiment has a reduced deviation between the central portion and the edge portion.

In particular, compared with the conventional display device, the color coordinate (Y coordinate) at the edge portion of the display device according to an exemplary embodiment is remarkably increased. The ratio of the blue light irradiated from the display device is decreased by the light-converting material 101 included in the edge portion of the display device 1 according to an exemplary embodiment.

By applying the light-converting material 101 to the edge portion of the reflective sheet 55, it is possible to reduce the deviation of color between the central portion and the edge portion of the display device 1 as shown in FIG. 10.

The display device 1 in which the light-converting material 101 is applied to the edge portion of the reflective sheet 55 to compensate for a lack of the light recycling at the edge portion of the display device 1 is described above.

Various display devices compensating for the lack of the light recycling at the edge portion of the display device are described below.

Figure 11:
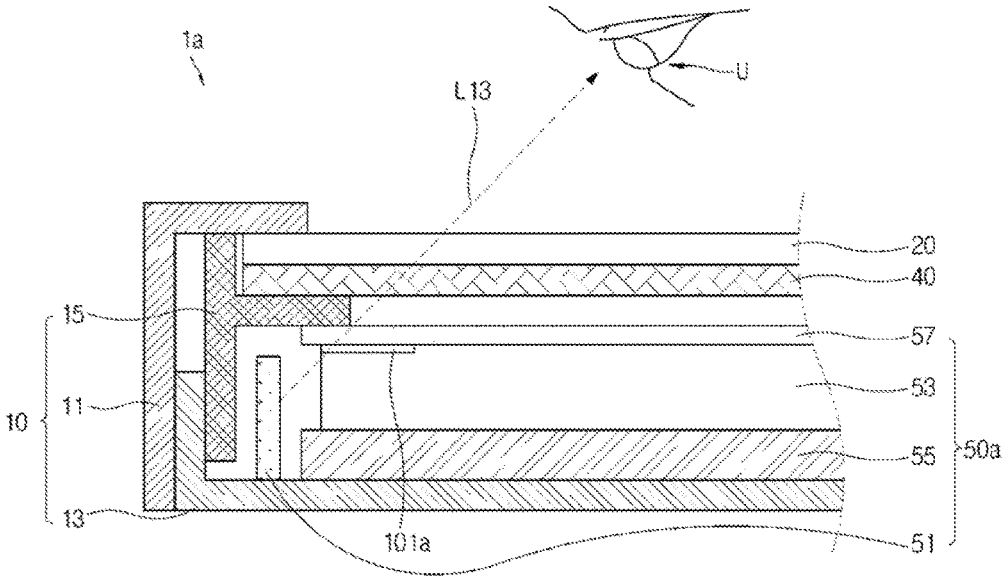
FIG. 11 is a view showing a side section of a display device according to an exemplary embodiment.

FIG. 11 shows a side section of a display device according to an exemplary embodiment.

Referring to FIG. 11, a display device 1a includes the main body 10 (11, 13, and 15), the display panel 20, the optical member 40, and a backlight unit 50a. The main body 10, the display panel 20, and the optical member 40 are the same as the main body 10 (see FIG. 3), the display panel 20 (see FIG. 3), and the optical member 40 (see FIG. 3) of the display device 1 (see FIG. 3) according to an exemplary embodiment. Therefore, the description thereof is omitted.

The backlight unit 50a includes the light source 51, the light guide plate 53, the reflective sheet 55, the quantum dot sheet 57, and a light-converting material 101a. The light source 51, the light guide plate 53, the reflective sheet 55, and the quantum dot sheet 57 are the same as the light source 51 (see FIG. 3), the light guide plate 53 (see FIG. 3), the reflective sheet 55 (see FIG. 3), and the quantum dot sheet 57 (see FIG. 3) of the display device 1 (see FIG. 3) according to an exemplary embodiment. Therefore, the description thereon is omitted.

The light-converting material 101a is a material which irradiates the visible light when the light is incident from the outside. The light-converting material 101a may be applied to the edge portion of the front surface of the light guide plate 53. Once the light (in particular, the blue light) is incident, the light-converting material 101a may convert some of the incident light into the yellow light or the green light and may transmit some of the incident light. As a result, once the light is incident on the light-converting material 101a, the light-converting material 101a may irradiate the white light including the blue, yellow, and green lights.

The above light-converting material 101a may compensate a lack of the light recycling at an edge portion of the backlight unit 50a. In particular, the light-converting material 101a applied to the edge portion of the front surface of the light guide plate 53 may convert light L13 into the white light. Light L13 is monochromatic light (the blue light) emitted from the light source 51 provided at an edge of the backlight unit 50a, and is irradiated to the outside of the display device 1a through the light guide plate 53 and the quantum dot sheet 57. As a result, the light-converting material 101a may increase the ratio of the white light in the light irradiated from the edge portion of the backlight unit 50a.

As described above, due to the light-converting material 101a applied to the edge portion of the front surface of the light guide plate 53, the ratio of the white light in the light irradiated from the edge portion of the backlight unit 50a is increased and the deviation of the color coordinate between the edge portion and a central portion of the backlight unit 50a is decreased.

Although the light-converting material 101a applied to the edge portion of the front surface of the light guide plate 53 is described in the above description, the disclosure is not limited thereto, and the light-converting material 101a may be applied to the edge portion of the rear surface of the quantum dot sheet 57. In other words, the light-converting material 101a may be placed between the light guide plate 53 and the quantum dot sheet 57.

Figure 12:
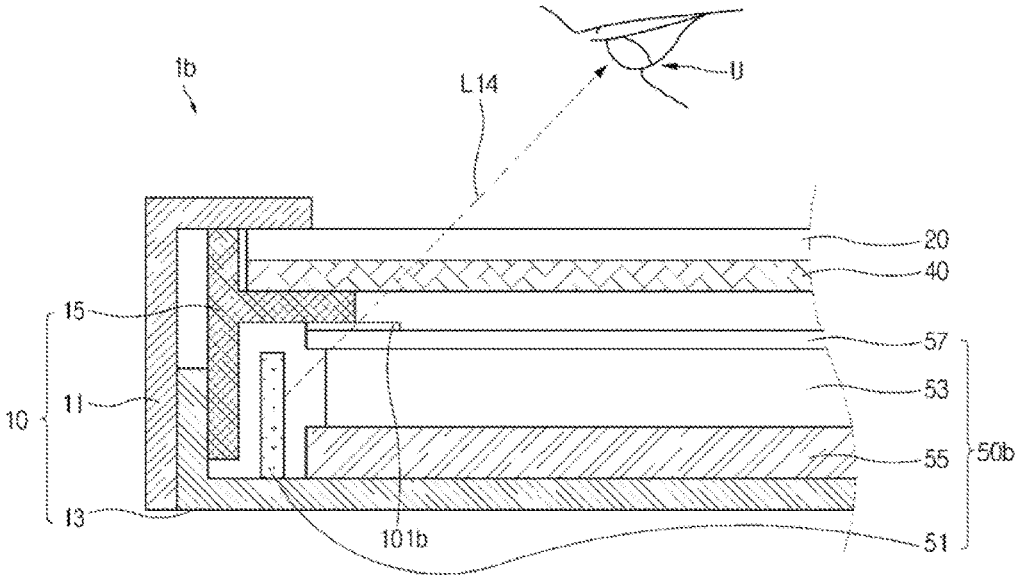
FIG. 12 is a view showing a side section of a display device according to an exemplary embodiment.

FIG. 12 shows a side section of a display device according to an exemplary embodiment.

Referring to FIG. 12, a display device 1b includes the main body 10 (11, 13, and 15), the display panel 20, the optical member 40 and a backlight unit 50b. The main body 10, the display panel 20, and the optical member 40 are the same as the main body 10 (see FIG. 3), the display panel 20 (see FIG. 3), and the optical member 40 (see FIG. 3) of the display device 1 (see FIG. 3) according to an exemplary embodiment. Therefore, the description thereof is omitted.

The backlight unit 50b includes the light source 51, the light guide plate 53, the reflective sheet 55, the quantum dot sheet 57, and a light-converting material 101b. The light source 51, the light guide plate 53, the reflective sheet 55, and the quantum dot sheet 57 are the same as the light source 51 (see FIG. 3), the light guide plate 53 (see FIG. 3), the reflective sheet 55 (see FIG. 3), and the quantum dot sheet 57 (see FIG. 3) of the display device 1 (see FIG. 3) according to an exemplary embodiment. Therefore, the description thereof is omitted.

The light-converting material 101b is a material which irradiates the visible light when the light is incident from the outside. The light-converting material 101b may be applied to the edge portion of the front surface of the quantum dot sheet 57. Once the light (in particular, the blue light) is incident, the light-converting material 101b may convert some of the incident light into the yellow light or the green light and may transmit some of the incident light. As a result, once the light is incident on the light-converting material 101b, the light-converting material 101b may irradiate the white light including the blue, yellow, and green lights.

The above light-converting material 101b may compensate a lack of the light recycling at an edge portion of the backlight unit 50b. In particular, the light-converting material 101b applied to the edge portion of the front surface of the quantum dot sheet 57 may convert light L14 into the white light. Light L14 is monochromatic light (the blue light) emitted from the light source 51 provided at an edge of the backlight unit 50b, and is irradiated to the outside of the display device 1b through the light guide plate 53 and the quantum dot sheet 57. As a result, the light-converting material 101b may increase the ratio of the white light in the light irradiated from the edge portion of the backlight unit 50b.

As described above, due to the light-converting material 101b applied to the edge portion of the front surface of the quantum dot sheet 57, the ratio of the white light in the light irradiated from the edge portion of the backlight unit 50b is increased and the deviation of the color coordinate between the edge portion and a central portion of the backlight unit 50b is decreased.

Figure 13:
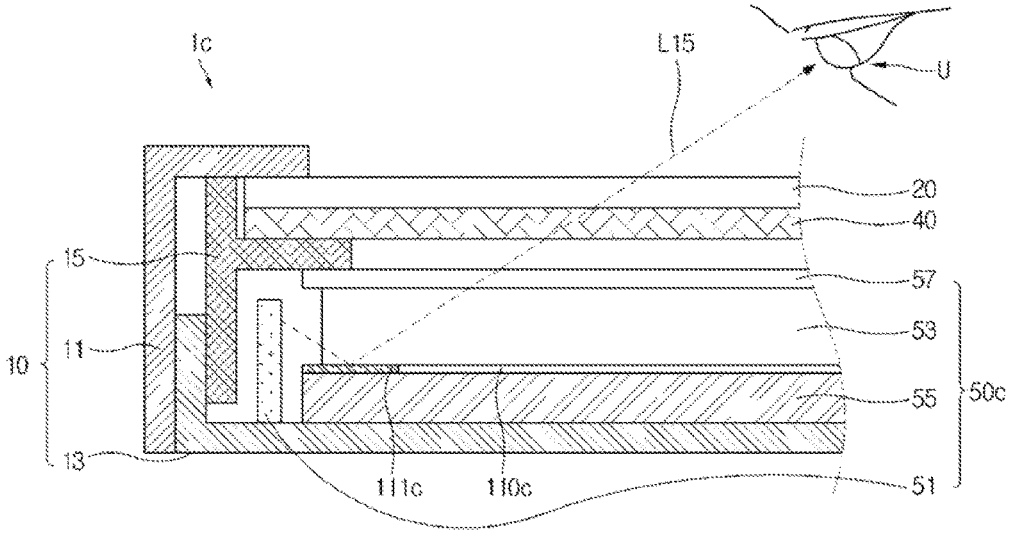
FIG. 13 is a view showing a side section of a display device according to an exemplary embodiment.

FIG. 13 shows a side section of a display device according to an exemplary embodiment.

Referring to FIG. 13, a display device 1c includes the main body 10 (11, 13, and 15), the display panel 20, the optical member 40, and a backlight unit 50c. The main body 10, the display panel 20, and the optical member 40 are the same as the main body 10 (see FIG. 3), the display panel 20 (see FIG. 3), and the optical member 40 (see FIG. 3) of the display device 1 (see FIG. 3) according to an exemplary embodiment. Therefore, the description thereof is omitted.

In addition, the backlight unit 50c includes the light source 51, the light guide plate 53, the reflective sheet 55, the quantum dot sheet 57, and an optical sheet 110c. The light source 51, the light guide plate 53, the reflective sheet 55, and the quantum dot sheet 57 are the same as the light source 51 (see FIG. 3), the light guide plate 53 (see FIG. 3), the reflective sheet 55 (see FIG. 3), and the quantum dot sheet 57 (see FIG. 3) of the display device 1 (see FIG. 3) according to an exemplary embodiment. Therefore, the description thereof is omitted.

The optical sheet 110c is a film formed of a transparent material and may be provided between the reflective sheet 55 and the light guide plate 53. Also, an edge portion of the optical sheet 110c may include a light-converting material 111c. The light-converting material 111c is a material which irradiates the visible light when the light is incident from the outside. Once the light (in particular, the blue light) is incident, the light-converting material 111c may convert some of the incident light into the yellow light or the green light and may transmit some of the incident light. As a result, once the light is incident on the light-converting material 111c, the light-converting material 111c may irradiate the white light including the blue, yellow, and green lights.

The above optical sheet 110c may compensate a lack of the light recycling at an edge portion of the backlight unit 50c. In particular, the light-converting material 111c included in the edge portion of the optical sheet 110c may convert light L15 into the white light. Light L15 is monochromatic light (the blue light) emitted from the light source 51 provided at an edge of the backlight unit 50c and reflected from the reflective sheet 55, and is irradiated to the outside of the display device 1c. As a result, the optical sheet 110c may increase the ratio of the white light in the light irradiated from the edge portion of the backlight unit 50c.

As described above, due to the optical sheet 110c including the light-converting material 111c applied to the edge portion thereof, the ratio of the white light in the light irradiated from the edge portion of the backlight unit 50c is increased and the deviation of the color coordinate between the edge portion and a central portion of the backlight unit 50c is decreased.

Figure 14:
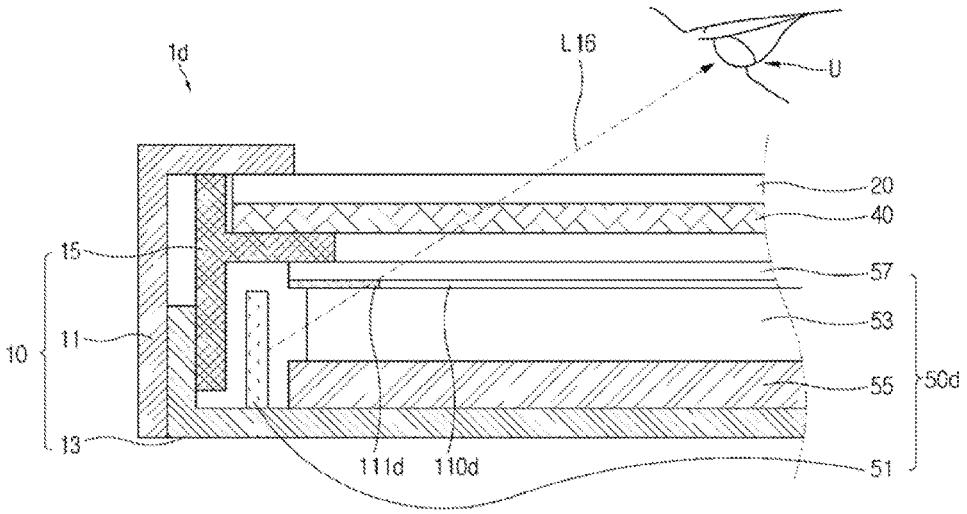
FIG. 14 is a view showing a side section of a display device according to an exemplary embodiment.

FIG. 14 shows a side section of a display device according to an exemplary embodiment.

Referring to FIG. 14, a display device 1d includes the main body 10 (11, 13, and 15), the display panel 20, the optical member 40, and a backlight unit 50d. The main body 10, the display panel 20, and the optical member 40 are the same as the main body 10 (see FIG. 3), the display panel 20 (see FIG. 3), and the optical member 40 (see FIG. 3) of the display device 1 (see FIG. 3) according to an exemplary embodiment. Therefore, the description thereof is omitted.

In addition, the backlight unit 50d includes the light source 51, the light guide plate 53, the reflective sheet 55, the quantum dot sheet 57, and an optical sheet 110d. The light source 51, the light guide plate 53, the reflective sheet 55, and the quantum dot sheet 57 are the same as the light source 51 (see FIG. 3), the light guide plate 53 (see FIG. 3), the reflective sheet 55 (see FIG. 3), and the quantum dot sheet 57 (see FIG. 3) of the display device 1 (see FIG. 3) according to an exemplary embodiment. Therefore, the description thereof is omitted.

The optical sheet 110d is a film formed of a transparent material and may be provided between the light guide plate 53 and the quantum dot sheet 57. Also, an edge portion of the optical sheet 110d may include a light-converting material 111d. The light-converting material 111d is a material which irradiates the visible light when the light is incident from the outside. Once the light (in particular, the blue light) is incident, the light-converting material 111d may convert some of the incident light into the yellow light or the green light and may transmit some of the incident light. As a result, once the light is incident on the light-converting material 111d, the light-converting material 111d may irradiate the white light including the blue, yellow, and green lights.

The above optical sheet 110d may compensate a lack of the light recycling at an edge portion of the backlight unit 50d. In particular, the light-converting material 111d included in the edge portion of the optical sheet 110d may convert light L16 into the white light. Light L16 is monochromatic light (the blue light) emitted from the light source 51 provided at an edge of the backlight unit 50d, and is irradiated to the outside of the display device 1d through the light guide plate 53 and the quantum dot sheet 57. As a result, the optical sheet 110d may increase the ratio of the white light in the light irradiated from the edge portion of the backlight unit 50d.

As described above, due to the optical sheet 110d including the light-converting material 111d applied to the edge portion thereof, the ratio of the white light in the light irradiated from the edge portion of the backlight unit 50d is increased and the deviation of the color coordinate between the edge portion and a central portion of the backlight unit 50d is decreased.

Figure 15:
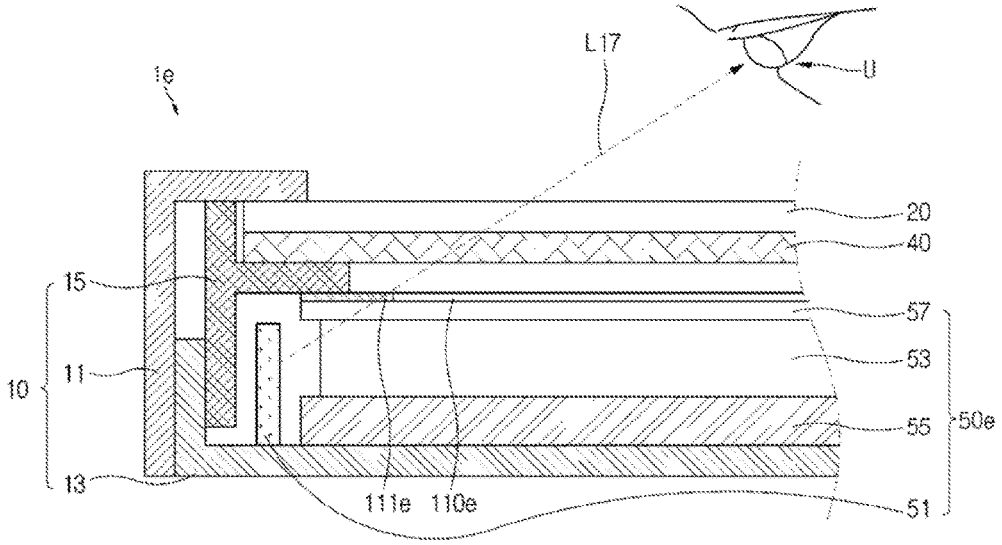
FIG. 15 is a view showing a side section of a display device according to an exemplary embodiment.

FIG. 15 shows a side section of a display device according to further another embodiment.

Referring to FIG. 15, a display device 1e includes the main body 10 (11, 13, and 15), the display panel 20, the optical member 40, and a backlight unit 50e. The main body 10, the display panel 20, and the optical member 40 are the same as the main body 10 (see FIG. 3), the display panel 20 (see FIG. 3), and the optical member 40 (see FIG. 3) of the display device 1 (see FIG. 3) according to an exemplary embodiment. Therefore, the description thereof is omitted.

In addition, the backlight unit 50e includes the light source 51, the light guide plate 53, the reflective sheet 55, the quantum dot sheet 57, and an optical sheet 110e. The light source 51, the light guide plate 53, the reflective sheet 55, and the quantum dot sheet 57 are the same as the light source 51 (see FIG. 3), the light guide plate 53 (see FIG. 3), the reflective sheet 55 (see FIG. 3), and the quantum dot sheet 57 (see FIG. 3) of the display device 1 (see FIG. 3) according to an exemplary embodiment. Therefore, the description thereof is omitted.

The optical sheet 110e is a film formed of a transparent material and may be provided at a front side of the quantum dot sheet 57. Also, an edge portion of the optical sheet 110e may include a light-converting material 111e. Here, the light-converting material 111e is a material which irradiates the visible light when the light is incident from the outside. Once the light (in particular, the blue light) is incident, the light-converting material 111e may convert some of the incident light into the yellow light or the green light and may transmit some of the incident light. As a result, once the light is incident on the light-converting material 111e, the light-converting material 111e may irradiate the white light including the blue, yellow, and green lights.

The above optical sheet 110e may compensate a lack of the light recycling at an edge portion of the backlight unit 50e. In particular, the light-converting material 111e included in the edge portion of the optical sheet 110e may convert light L17 into the white light. Light L17 is monochromatic light (the blue light) emitted from the light source 51 provided at an edge of the backlight unit 50e, and is irradiated to the outside of the display device 1e through the light guide plate 53 and the quantum dot sheet 57. As a result, the optical sheet 110e may increase the ratio of the white light in the light irradiated from the edge portion of the backlight unit 50e.

As described above, due to the optical sheet 110e including the light-converting material 110e applied to the edge portion thereof, the ratio of the white light in the light irradiated from the edge portion of the backlight unit 50e is increased and the deviation of the color coordinate between the edge portion and a central portion of the backlight unit 50e is decreased.

Although exemplary embodiments of the disclosure have been shown and described, it would be appreciated by those skilled in the art that changes may be made in these exemplary embodiments without departing from the principles and spirit of the exemplary embodiments, the scope of which is defined in the claims and their equivalents.

What is claimed is:

1. A display device, comprising:

at least one light source configured to emit a blue light;

a light guide plate on which the blue light emitted from the at least one light source is incident, and which is configured to irradiate light through a first surface and a second surface of the light guide plate;

a quantum dot sheet on which the light irradiated through the first surface of the light guide plate is incident, and which is configured to irradiate the blue light, a green light and a red light;

a reflective sheet configured to reflect the light, which is irradiated through the second surface of the light guide plate, to the light guide plate; and a light-converting material provided on a surface of an edge portion of the reflective sheet and configured to convert at least a portion of the blue light incident thereto into light of a different color and irradiate the converted light to the light guide plate.

2. The display device according to claim 1, wherein the light-converting material is configured to convert the at least the portion of the blue light incident thereto into a yellow light, and the blue light emitted from the at least one light source and the yellow light converted by the light-converting material are incident on the quantum dot sheet.

3. The display device according to claim 1, wherein the light-converting material comprises a fluorescent material, the fluorescent material converting the blue light into a yellow light.

4. The display device according to claim 1, wherein the light-converting material is applied to the reflective sheet in an area extending from at least one edge of the reflective sheet.

5. The display device according claim 4, wherein the light-converting material is applied in patterns to the reflective sheet, and an area of the patterns of the light-converting material decreases as a distance from the at least one edge of the reflective sheet is increased.

6. The display device according to claim 4, wherein the light-converting material is applied in patterns to the reflective sheet, and a density of the patterns of the light-converting material decreases as a distance from the at least one edge of the reflective sheet is increased.

7. The display device according to claim 4, wherein the light-converting material is applied in a circular pattern to the reflective sheet, and the circular pattern comprises a plurality of circles, a size of the plurality of circles decreasing as a distance from the at least one edge of the reflective sheet is increased.

8. The display device according to claim 1, wherein the light-converting material is applied in a polygonal pattern to the reflective sheet.

9. The display device according to claim 1, wherein the light-converting material is applied in a stripe pattern to the reflective sheet.

10. A display device, comprising:

at least one light source configured to emit a blue light;

a light guide plate on which the blue light emitted from the at least one light source is incident, and which is configured to irradiate light through a first surface and a second surface of the light guide plate;

a quantum dot sheet on which the light irradiated through the first surface of the light guide plate is incident, and which is configured to irradiate the blue light, a green light, and a red light; and a reflective sheet configured to reflect the light, which is irradiated through the second surface of the light guide plate, to the light guide plate, wherein at least a portion of the blue light incident on a surface of an edge portion of the reflective sheet is converted into light of a color different from a color of the blue light.

11. The display device according to claim 10, wherein the at least the portion of the blue light incident on the surface of the edge portion of the reflective sheet is converted into a yellow light, and the yellow light converted by the edge portion of the reflective sheet and the blue light emitted from the at least one light source are incident on the quantum dot sheet.

12. The display device according to claim 10, wherein a fluorescent material is applied to the edge portion of the reflective sheet, the fluorescent material converting the light into a yellow light.

13. The display device according to claim 12, wherein the fluorescent material is applied to the reflective sheet in an area extending from at least one edge of the reflective sheet.

14. The display device according to claim 13, wherein the fluorescent material is applied in patterns to the reflective sheet, and an area of the patterns of the fluorescent material decreases as a distance from the at least one edge of the reflective sheet is increased.

15. The display device according to claim 13, wherein the fluorescent material is applied in patterns to the reflective sheet, and a density of the patterns of the fluorescent material decreases as a distance from the at least one edge of the reflective sheet is increased.

16. The display device according to claim 13, wherein the fluorescent material is applied in a circular pattern to the reflective sheet, and the circular pattern comprises a plurality of circles, a size of the plurality of circles decreasing as a distance from the at least one edge of the reflective sheet is increased.

17. The display device according to claim 12, wherein the fluorescent material is applied in a polygonal pattern to the reflective sheet.

18. The display device according to claim 12, wherein the fluorescent material is applied in a stripe pattern to the reflective sheet.

19. A display device, comprising:

at least one light source configured to emit a blue light;

a light guide plate on which the blue light emitted from the at least one light source is incident, and which is configured to irradiate light through a first surface and a second surface of the light guide plate;

a quantum dot sheet on which the light irradiated through the first surface of the light guide plate is incident, and *which is* configured to irradiate the blue light, a green light, and a red light;

a reflective sheet configured to reflect the blue light, which is irradiated through the second surface of the light guide plate, to the light guide plate; and an optical sheet disposed on the reflective sheet, wherein at least a portion of the blue light incident on a surface of an edge portion of the optical sheet through the second surface is converted into light of a color different from a color of the blue light and is irradiated to the light guide plate.

20. The display device according to claim 19, wherein the at least the portion of the blue light incident on the edge portion of the optical sheet is converted into a yellow light, and wherein the blue light emitted from the at least one light source and the yellow light converted by the optical sheet are incident on the quantum dot sheet.

*21. A display device, comprising:*

*at least one light source configured to emit blue light;*

*a light guide plate on which the blue light emitted from the at least one light source is incident, and which is configured to irradiate light through a first surface and a second surface of the light guide plate;*

*a quantum dot sheet on which the light irradiated through the first surface of the light guide plate is incident, and which is configured to irradiate the blue light, a green light and a red light;*

*a reflective sheet configured to reflect the light, which is irradiated through the second surface of the light guide plate, to the light guide plate; and*

*a plurality of light-converting dots provided on a surface of an edge portion of the reflective sheet and configured to convert at least a portion of the blue light incident thereto into light of a different color and irradiate the converted light to the light guide plate,*

*wherein the plurality of light-converting dots includes first dots, second dots, and third dots, the second dots*

*having a dot size smaller than a dot size of the first dots, respectively, and the third dots having a dot size smaller than a dot size of the second dots, respectively,*

*the first dots are located closer to an edge of the reflective sheet than the second dots, and*

*the second dots are located closer to the edge of the reflective sheet than the third dots.*

*22. A display device, comprising:*

*a display panel;*

*at least one light source configured to emit a blue light;*

*a light guide plate on which the blue light emitted from the at least one light source is incident;*

*a quantum dot sheet disposed between the display panel and the light guide plate;*

*a reflective sheet disposed below the light guide plate; and*

*a plurality of light-converting dots provided on a surface of an edge portion of the reflective sheet and configured to convert at least a portion of the blue light incident thereto into light of a different color,*

*wherein the plurality of light-converting dots includes first dots, second dots, and third dots, the second dots having a dot size smaller than a dot size of the first dots, respectively, and the third dots having a dot size smaller than a dot size of the second dots, respectively,*

*the first dots are located closer to an edge of the reflective sheet than the second dots, and*

*the second dots are located closer to the edge of the reflective sheet than the third dots.*

* * * * *